US010295333B2

(12) United States Patent
Fish et al.

(10) Patent No.: US 10,295,333 B2
(45) Date of Patent: May 21, 2019

(54) TIRE TREAD DEPTH MEASUREMENT

(71) Applicant: BOSCH AUTOMOTIVE SERVICE SOLUTIONS INC., Warren, MI (US)

(72) Inventors: James Fish, Birmingham, MI (US); Vijai M. Thoppae, Canton, MI (US); Sharath Kommera, Novi, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 341 days.

(21) Appl. No.: 15/011,786

(22) Filed: Feb. 1, 2016

(65) Prior Publication Data

US 2017/0190223 A1 Jul. 6, 2017

Related U.S. Application Data

(60) Provisional application No. 62/273,115, filed on Dec. 30, 2015.

(51) Int. Cl.

| | |
|---|---|
| ***G01B 11/22*** | (2006.01) |
| ***H04N 7/18*** | (2006.01) |
| ***G06T 17/00*** | (2006.01) |
| ***G01M 17/02*** | (2006.01) |
| ***H04N 1/00*** | (2006.01) |
| ***H04N 5/232*** | (2006.01) |
| ***G06T 7/00*** | (2017.01) |

(52) U.S. Cl.
CPC ........... *G01B 11/22* (2013.01); *G01M 17/027* (2013.01); *G06T 7/001* (2013.01); *G06T 17/00* (2013.01); *H04N 1/00* (2013.01); *H04N 5/232* (2013.01); *H04N 7/18* (2013.01)

(58) Field of Classification Search
CPC ...................................................... G01B 11/22
See application file for complete search history.

(56) References Cited

U.S. PATENT DOCUMENTS 9,805,697 B1 * 10/2017 Dorrance ................. G09G 5/40
2016/0221404 A1 * 8/2016 Lee ....................... B60C 11/246
2016/0343126 A1 * 11/2016 Miller ................... G06T 7/0006

FOREIGN PATENT DOCUMENTS

WO 2015110841 A1 † 7/2015

* cited by examiner
† cited by third party

*Primary Examiner* — James M Pontius
(74) *Attorney, Agent, or Firm* — Baker & Hostetler LLP

(57) ABSTRACT

This disclosure relates to a system and a method for measuring tire tread depth. The method includes receiving an image of a tire tread recorded using an image-recording device; analyzing the image of the tire tread captured to determine a tire tread depth; determining a status of the tire tread based on the tire tread depth; altering the image of the tire tread captured based on the determined status; and transmitting the altered image to a mobile device.

20 Claims, 10 Drawing Sheets

TIRE TREAD DEPTH MEASUREMENT

CROSS-REFERENCE TO RELATED APPLICATIONS

This application claims the benefit of U.S. provisional application entitled, TIRE TREAD DEPTH MEASUREMENT, filed Dec. 30, 2015, having a Ser. No. 62/273,115, the disclosure of which is hereby incorporated by reference in its entirety.

TECHNICAL FIELD

This disclosure is generally related to measuring a depth of a tire tread. Specifically, this disclosure is directed to measuring the depth of a tire tread by comparing an image of the tire tread to previous images of tire treads of known depth.

BACKGROUND

In the automotive industry, the condition of tire treads on tires on a vehicle is important for safety. A new tire on a vehicle, such as a car, typically has a tread depth of 8 mm. As the tire is used, the tread depth diminishes. As the tread depth diminishes, safety risks of driving using those tires increases. For example, when roads are wet, deeper tread depths help channel water away so that the tire maintains contact with the road. This reduces the chances that the vehicle will hydroplane. The risks of worn out tires is also increased in dry weather driving. Since a worn out tire has a lower tread depth, the tire is thinner. A thinner tire increases the chance that the tire will be punctured and cause a tire failure. Not only do deeper tread depths increase safety, but they may also be legally required. For example, in the United States, the minimum legal tread depth is 1.6 mm. Thus, it is useful for a driver to know to the tread depths for the tires on the driver's car.

Previously, however, determining the tread depth was either inaccurate or cost-prohibitive for a home mechanic. One known method to determine if a tire tread is too shallow is the so-called "penny method". In the penny method, the home mechanic inserts a penny into the tire tread. If the tire tread reaches a certain level on the penny, then tread depth may be sufficient for safe operation. This method is a very rough approximation for tread depth, however. Another method is to use a tread depth gauge. A tread depth gauge may be positioned on a tread to determine tread depth. However, this requires the home mechanic to buy a potentially expensive piece of equipment. Additionally, the tread depth gauge may not be intuitive to use. Another method is to use a high end laser or optical sensor system. However, these systems are generally used in an automotive dealership environment. They may require a significant amount of space and may be cost-prohibitive. Thus, this method would be impractical for a home mechanic.

Accordingly, there is a need for an inexpensive and easy to use system to determine the condition of tire tread depth.

SUMMARY

In one aspect of this disclosure, a method for measuring tire tread depth, the method comprising: receiving an image of a tire tread recorded using an image-recording device; analyzing the image of the tire tread captured to determine a tire tread depth; determining a status of the tire tread based on the tire tread depth; altering the image of the tire tread captured based on the determined status; and transmitting the altered image to a mobile device is disclosed.

In another aspect of this disclosure, a system for measuring tire tread depth, the system comprising: a transceiver configured to receive and transmit an image of a tire tread; a computer-readable storage medium configured to store computer-executable instructions; and a computer processor configured to execute the computer-executable instructions, the computer-executable instructions comprising: receiving an image of a tire tread recorded using an image-recording device; analyzing the image of the tire tread captured to determine a tire tread depth; determining a status of the tire tread based on the tire tread depth; altering the image of the tire tread captured based on the determined status; and transmitting the altered image to a mobile device is disclosed.

In yet another aspect of this disclosure, a method for measuring tire tread depth, the method comprising: recording an image of a tire tread using an image-recording device; analyzing the image of the tire tread captured to determine a tire tread depth; determining a status of the tire tread based on the tire tread depth; altering the image of the tire tread captured based on the determined status; and displaying the altered image of the tire tread on a display is disclosed.

DETAILED DESCRIPTION

Broadly, this disclosure relates to recording a current image of a tire and tire treads and comparing that image to previous images of tires and tire treads of known depth to determine the tread depth of the tire treads in the current image. Aspects of the present disclosure provide a system and method for analyzing tire tread depths using images of tires. While various aspects of the present disclosure are discussed in the context of a vehicular diagnostic tool, other architectures and applications are clearly contemplated. In this context, vehicles include automobiles, motorcycles, trucks, boats, plans, helicopters, agricultural equipment (e.g., harvesters), construction equipment (e.g., excavators), etc.

Figure 1:
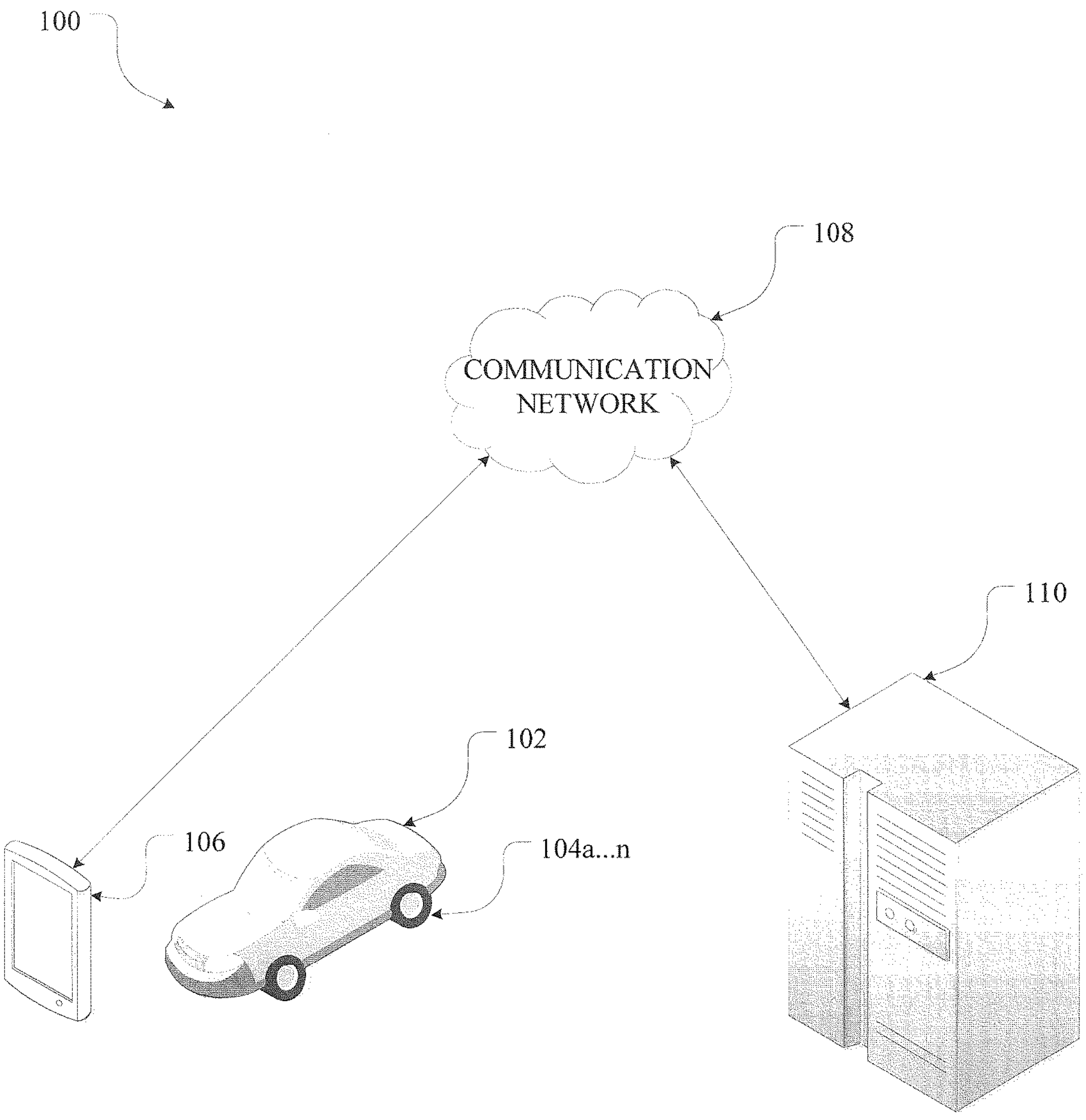
FIG. 1 shows the components included in the system, according to one aspect of this disclosure.
Figure 4:
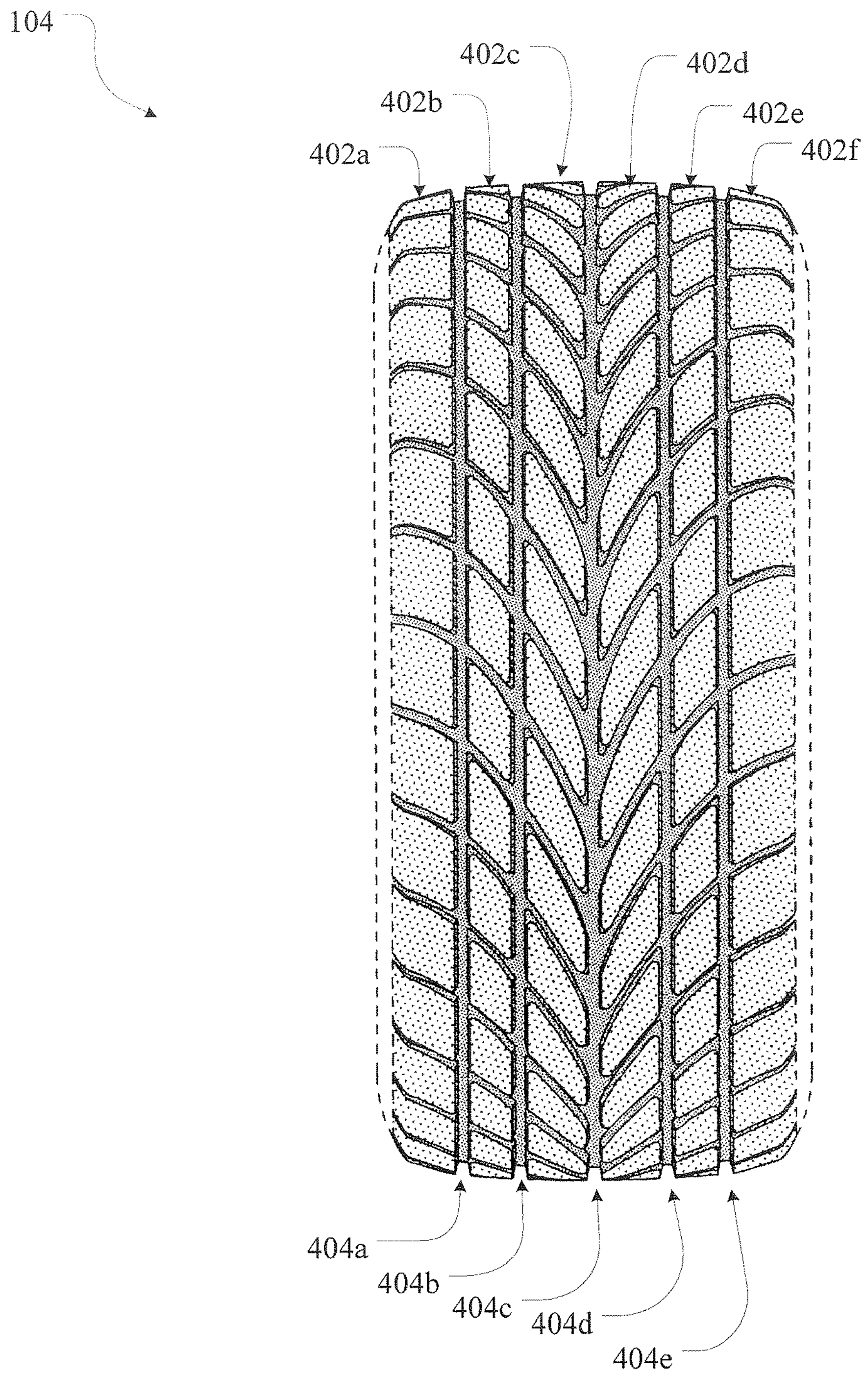
FIG. 4 shows a front view of a tire of the vehicle, according to one aspect of this disclosure.

This disclosure will now be described with reference to the drawing figures, in which like reference numerals refer to like parts throughout. FIG. 1 shows the components included in the system 100, according to one aspect of this disclosure. The system 100 may include a vehicle 102, at least one vehicle tire 104$a$ . . . $n$, a mobile device 106, a communication network 108, and a remote computer 110. The vehicle 102 may be any vehicle with tires that have tire treads. For purposes of example only, this disclosure will assume the vehicle 102 is a car. Other examples include 18-wheelers, an all-terrain vehicle, and a dump truck. The vehicle 102 may include at least one vehicle tire 104$a$ . . . $n$. The vehicle tire 104$a$ . . . $n$ may have a plurality of treads 402$a$, 402$b$, 402$c$, 402$d$, 402$e$, 402$f$ (shown in FIG. 4). Although five treads are shown in FIG. 4, one of ordinary skill in the art would recognize that the present disclosure may be used on vehicle tires 104$a$ . . . $n$ with any number of treads 402. Each tread 402 may have a tread depth. A new vehicle tire 104$a$ . . . $n$ may initially have a tread depth of about 8 mm. However, as the vehicle tire 104$a$ . . . $n$ is used, that depth may decrease and cause safety problems as outlined above.

The system 100 may also include a mobile device 106. The mobile device 106 may be any type of computing device, such as a smartphone, smart glasses, game console or system, a tablet, a personal digital assistant, a smartwatch, a laptop, a digital still camera, and a digital video camera. The mobile device 106 will be further described herein with reference to FIG. 2.

The system 100 may also include a remote computer 110. The remote computer 110 may be any computing device, such as a desktop, a laptop, and a server. The remote computer 110 will be further described herein with reference to FIG. 3.

The system 100 may also include a communication network 108. The mobile device 106 and the remote computer 110 may transfer data through the communication network 108 to carry out an aspect of this disclosure. For example, the mobile device 106 may transmit to the remote computer 110 an image of a tire 104. The remote computer 110 may transmit to the mobile device 106 an altered image indicating if a tire should be replaced because the tread depth is too shallow. The communication network 108 may include wired or wireless connections and may implement any data transfer protocols known to one of ordinary skill in the art. Examples of wireless connections may include RF (radio frequency), satellites, cellular phones (analog or digital), Bluetooth®, Wi-Fi, Infrared, ZigBee, Local Area Network (LAN), WLAN (Wireless Local Area Network), Wide Area Network (WAN), NFC (near field communication), other wireless communication configurations and standards, or a combination thereof.

Figure 2:
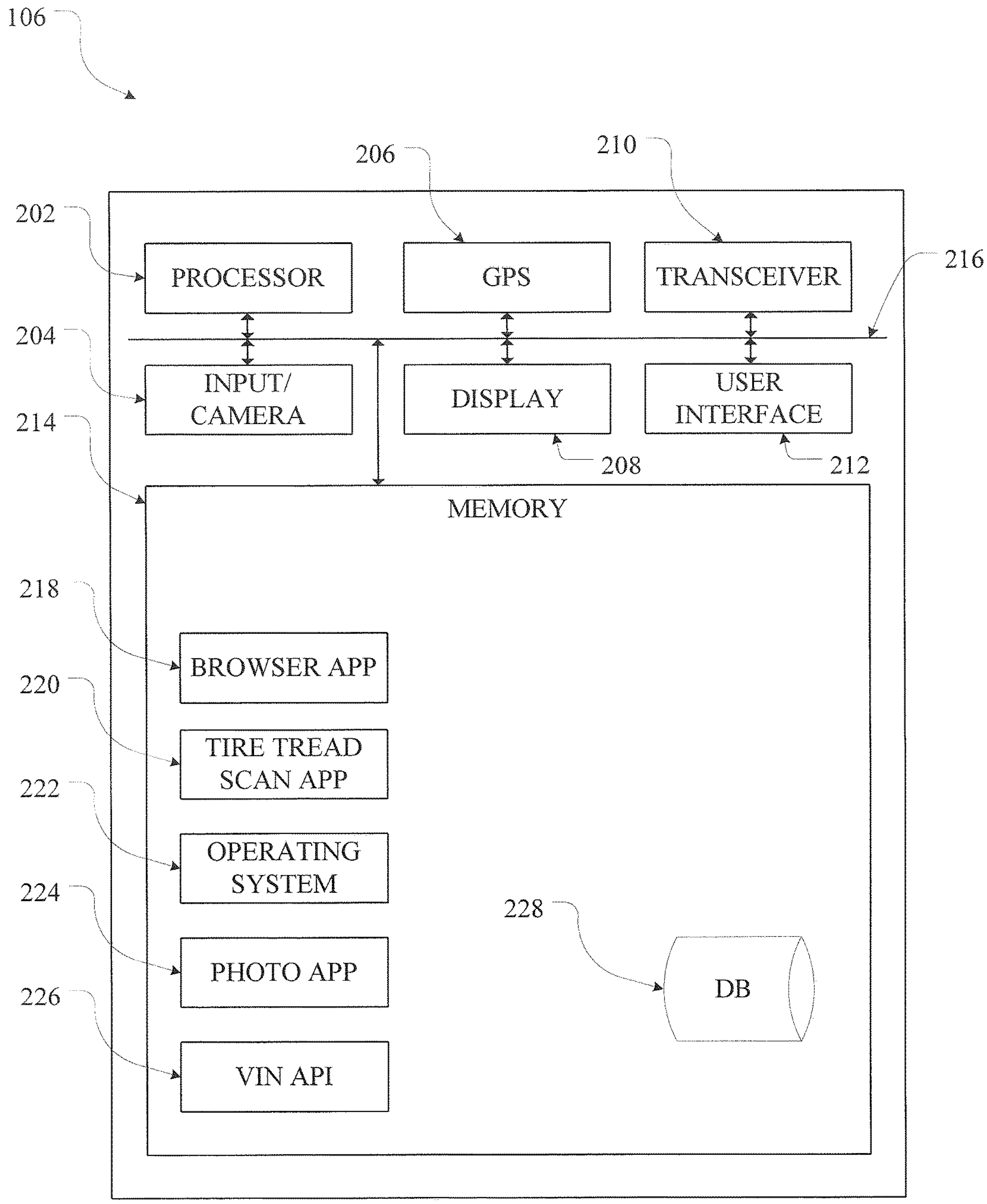
FIG. 2 shows internal components of the mobile device, according to one aspect of this disclosure.

FIG. 2 shows internal components of the mobile device 106, according to one aspect of this disclosure. For example, the mobile device 106 may include a processor 202, an input 204, such as a camera, a Global Positioning System (GPS) 206, a display 208, a transceiver 210, a user interface 212, and a memory 214. A communication bus 216 may allow the processor 202, the input 204, the GPS 206, the display 208, the transceiver 210, the user interface 212, and the memory 214 to communicate with each other. Any bus suitable for providing communication may be used. The memory 214 further includes a browser application 218, a tire tread scan application 220, an operating system 222, a photography application 224, a VIN API 226 and a database 228. The operating system 222 may be any suitable operating system, such as Apple iOS, Google Android, and Windows Phone. The processor 202 may be any suitable processor to carry out computer-executable instructions including field programmable gate array, controller, microprocessor, application specific integrated circuit (ASIC) and the like. The input 204 may be any suitable input, such as a keyboard, a mouse, a touch sensitive display, a digital still camera, and a digital video camera. The GPS 206 may be any suitable GPS sensor to determine a location of the mobile device 106. The display 208 may be any suitable display, such as an LED screen, an LCD screen, and a touch sensitive screen. The transceiver 210 may be any suitable device capable of transmitting and receiving data via a wired or wireless communication channel. The user interface 212 may provide any suitable interface for a user of the mobile device 106 to interact with the mobile device 106. For example, the user interface 212 may be a graphical user interface (GUI).

The browser application 218 may be any suitable browser to access the Internet. For example, the browser application 218 may be Google Chrome, Microsoft Internet Explorer, or Apple Safari and the browser application 218 may be a full or mobile version of these browser applications. The browser application 218 may be launched by, for example, tapping or clicking on a link in the tire tread scan application 220. The tire tread scan application 220 may be launched by a user of the mobile device 106 to determine the condition of the tire treads 402. The tire tread scan application 220 will be further described in reference to FIGS. 5-10. The photography application 224 may be used to record a digital still image or a digital video image using the input 204, such as a camera or any other image-recording device. The photographic application 224 may include features such as the ability to change contrasts, brightness, color, autofocus, autocorrect, crop, white balance, filters, digitally stitch a collection of pictures together to achieve one picture (like panoramic or 3D), and perform optical recognition and the like. The tire tread scan application 220 may use the photography application 224 to record digital still images or digital video images and/or manipulate the images of a vehicle tire 104 and a plurality of treads 402. Alternatively, or additionally, the tire tread scan application 220 may use digital still images or digital video images previously recorded by the photography application 224.

VIN API 226 or vehicle information number application program interface is provided in order to determine the vehicle to which the tires are attached to. The VIN API 226 may include logic to decode and identify the vehicle, stock images of the vehicles, descriptors, installed equipment, optional equipment (known installed and available), technical specifications, factory warranties, original vehicle & option pricing, OEM interior and exterior colors and the like.

A database 228 located in the memory 214 and/or may be located remotely. The database may contain information about tires, and related information such as tire treads dimensions, tire tread depths, and the like. The database may also include vehicle information for use by the VIN API 226.

Figure 3:
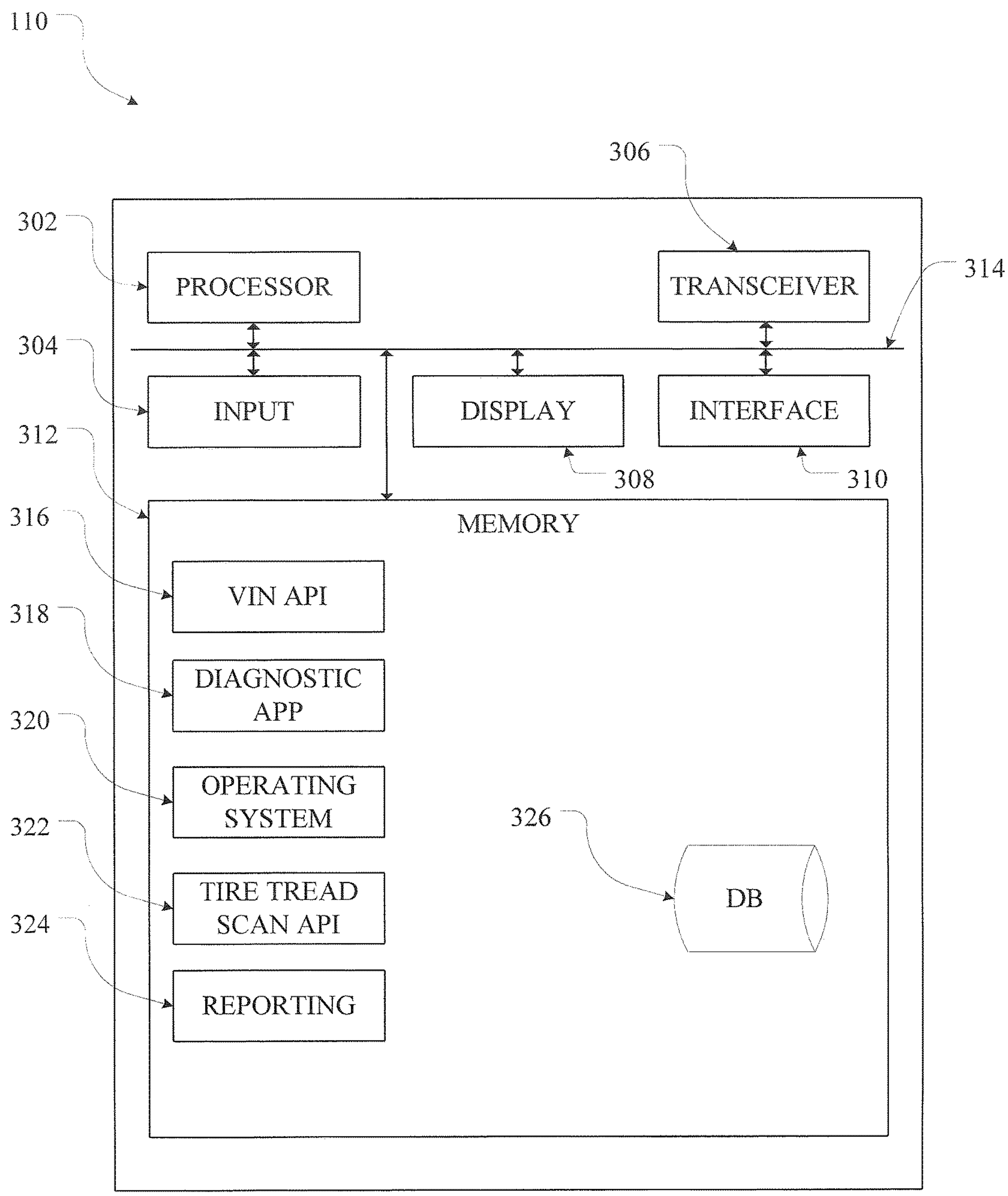
FIG. 3 shows the internal components of the remote computer, according to one aspect of this disclosure.

FIG. 3 shows the internal components of the remote computer 110, according to one aspect of this disclosure. The remote computer 110 may comprise a processor 302, an input 304, a transceiver 306, a display 308, an interface 310, and a memory 312. The remote computer may be used to process the information such as tire images collected by the wireless device 106. Alternative, all the processing may be done on the wireless device 106 and the resulting information is forward to remote computer 110 for storage. The memory 312 may further comprise a VIN API 316, a diagnostic application 318, an operating system 320, a tire tread scan API 322, and a reporting module 324. A communication bus 216 may allow the processor 302, the input 304, the transceiver 306, the display 308, the interface 310, and the memory 312 to communicate with each other. Any bus suitable for providing communication may be used. The operating system 320 may be any suitable operating system, such as Apple iOS, Google Android, and Windows Phone. The processor 302 may be any suitable processor to carry out computer-executable instructions. The input 304 may be any suitable input, such as a keyboard, a mouse, and a touch sensitive display. The display 308 may be any suitable display, such as an LED screen, an LCD screen, and a touch sensitive screen. The transceiver 306 may be any suitable device capable of transmitting and receiving data via a wired or wireless communication channel. The user interface 310 may provide any suitable interface for a user of the remote computer 110 to interact with the remote computer 110. For example, the user interface 212 may be a graphical user interface (GUI).

The VIN API 316 and the tire tread scan API 322 are similar to what is discussed previously described in FIG. 3 and below. A diagnostic application 318 may be included to diagnose issues with the vehicle 102 such as interpreting and diagnosing any retrieved diagnostic trouble code set in the vehicle. A reporting module 324 may collect data from various tires including new tires so that a tire profiles may be created so that tire tread depth can be accurately made.

FIG. 4 shows a front view of a tire 104 of the vehicle 102, according to one aspect of this disclosure. Only one tire 104 is shown in FIG. 4 for exemplary purposes. The tire 104 may have a plurality of tire treads 402*a* . . . *f*. The plurality of tire treads 402*a* . . . *f* may be spaced apart to form a plurality of grooves 404*a* . . . *e*. Tire tread depth may be measured as the difference separating an outer surface of the plurality of tire treads 402*a* . . . *f*, which may make contact with a surface, such as a road, and a bottom of the plurality of grooves 404*a* . . . *e*. For example, if the difference is greater than or equal to 5/32", then the tire tread depth may indicate that the tire is in excellent condition. Alternatively, if the difference is between 2/32" and 5/32", then the tire tread depth may indicate that the tire may need to be replaced soon. Alternatively, if the difference is less than 2/32", then the tire tread depth may indicate that the tire must be replaced. These values are only exemplary. One of ordinary skill in the art would recognize that various thresholds may be used to determine the status of tires based on tread depth.

Figure 5:
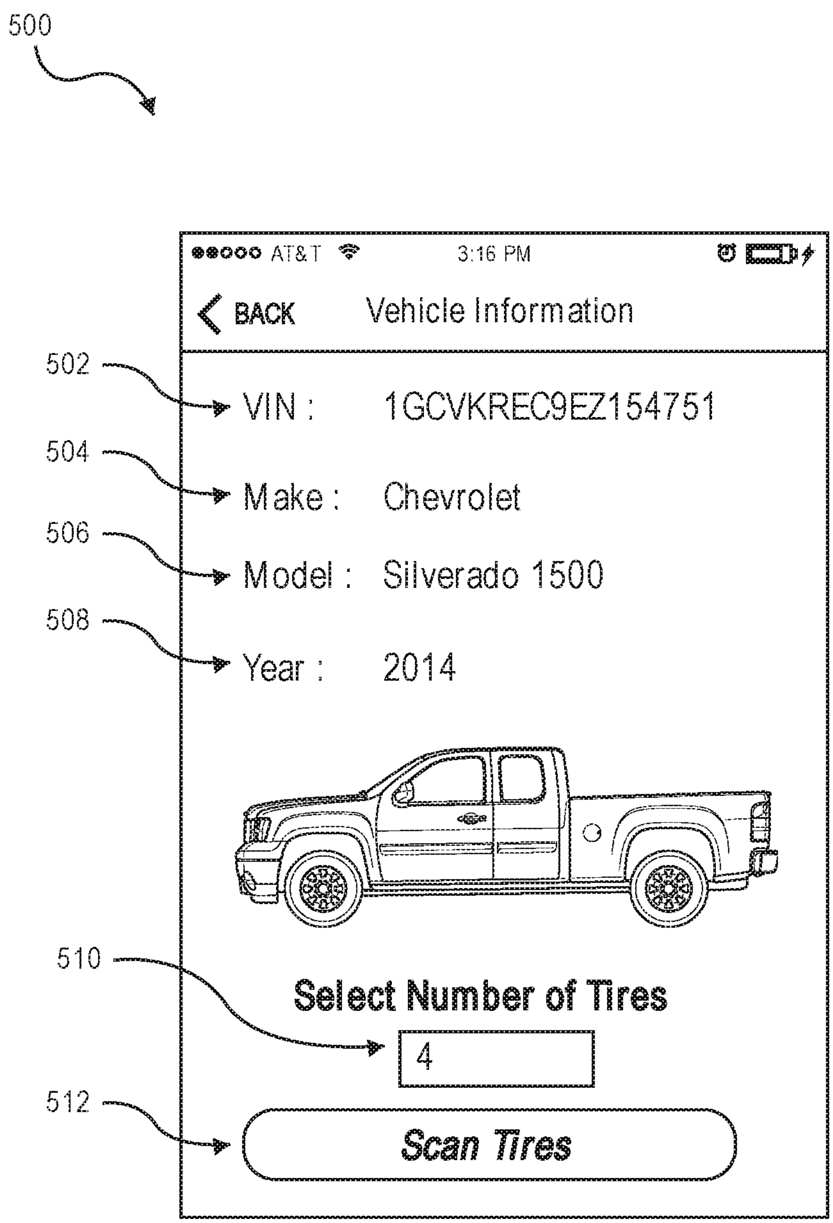
FIG. 5 shows an interface a user may interact with on the mobile device to identify a vehicle, according to one aspect of this disclosure.

FIG. 5 shows an interface 500 a user may interact with on the mobile device 106 to identify a vehicle, according to one aspect of this disclosure. The interface 500 may include a plurality of text fields 502, 504, 506, 508, 510. Alternatively, or additionally, the plurality of text fields 502, 504, 506, 508, 510 may be drop-down boxes, radio lists, or any other interface element known to one of ordinary skill in the art to input or select values. For exemplary purposes, this description will discuss the disclosure with respect to the plurality of text fields 502, 504, 506, 508, 510. The user may use interface 500 to identify the vehicle 102 under test. For example, in text field 502, the user may input the vehicle identification number (VIN) of the vehicle 102. When the user has input the VIN number, the mobile device 106 may identify the other identification aspects of the vehicle 102, such as make and model. The mobile device 106 may retrieve this information from memory 214. Alternatively, or additionally, the mobile device may retrieve this information from a cloud service or the remote computer 110. In another embodiment, the camera on the phone may be used to scan a bar code for the VIN of the vehicle or take a picture of the vehicle and use the VIN API through optical recognition to identify the vehicle.

However, if the mobile device 106 does not retrieve the other identification aspects of the vehicle 102 upon entering of the VIN number, the user may manually input the make of the vehicle 102 in text field 504. Additionally, the user may manually input the model of the vehicle 102 in text field 506. Alternatively, the mobile device 106 may limit the models available after the user has input the make of the vehicle 102. The mobile device 106 may retrieve this information from memory 214. Alternatively, or additionally, the mobile device may retrieve this information from a cloud service or the remote computer 110. Additionally, in text field 508, the user may input the model year of the vehicle 102. Additionally, the user may input the number of tires 104 the user wishes to scan in text field 510. Additionally, once all of the information has been entered, the user may actuate a button 512 to advance the tire tread depth scanning process.

Figure 6:
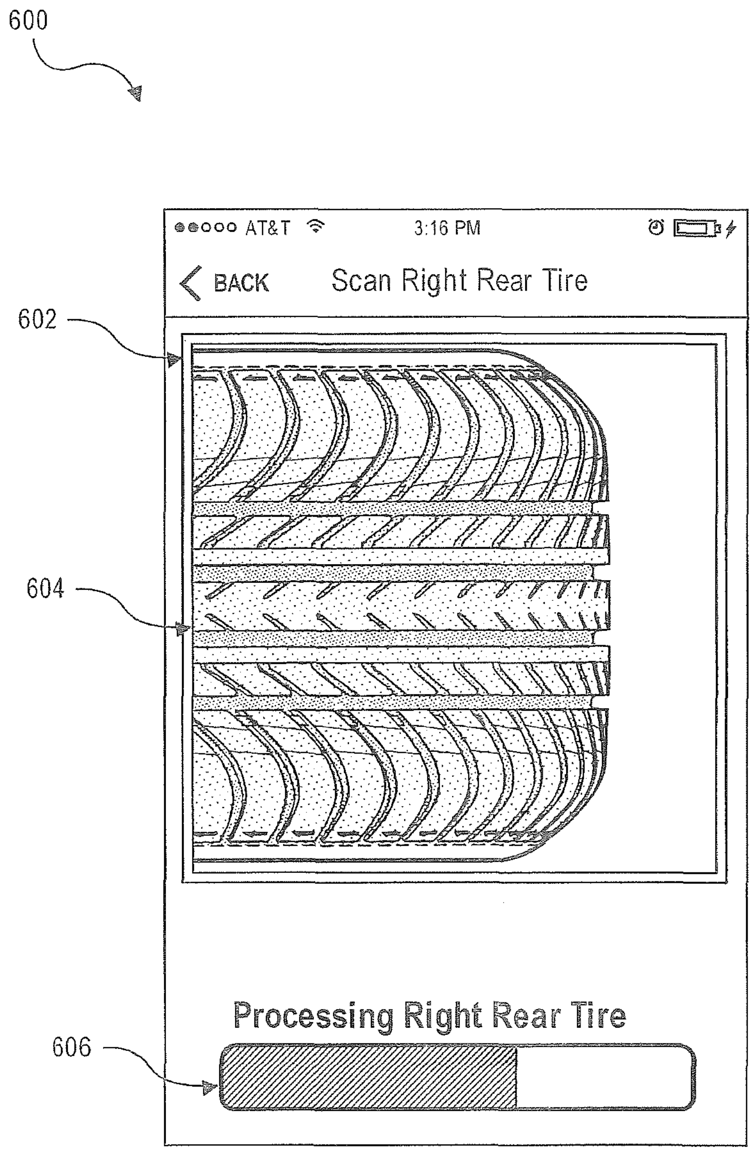
FIG. 6 shows an interface to a user may interact with to capture an image of a tire, according to one aspect of this disclosure

FIG. 6 shows an interface to 600 a user may interact with to capture an image 604 of a tire 104, according to one aspect of this disclosure. In this example of this disclosure, the right rear tire of the vehicle 102 is being scanned. One of ordinary skill in the art would recognize that any other tire 104 of the vehicle 102 may be scanned. The interface 600 may include a viewfinder 602. The viewfinder 602, may display the image 604 captured by the camera 204. In image 604, a tire 104 with the plurality of treads 402*a* . . . *f* and the plurality of grooves 404*a* . . . *e* is shown. The user may capture this image 604 of the tire 104 using the tire tread depth measurement application. Alternatively, the user may capture this image 604 using another application, such as a camera application, and then use the tire tread depth measurement application to import the previously captured image. Additionally, the user may either capture this image 604 or the user may capture a video recording of the tire 104 and the tire tread measurement application may select a frame of the video recording best suited for analysis.

Once the image 604 has been captured, the mobile device 106 may process the image 604. For example, the mobile device 106 may sharpen the image 604, may increase the contrast of the image 604, may increase or decrease the brightness of the image 604, or any other suitable image processing operations to enhance the image 604. In one embodiment, the higher contrast (darker) between the plurality of grooves 404*a* . . . *e* and the plurality of treads 402*a* . . . *f* may indicate that the tires has a longer tread depth than if the contrast was less, which may indicate that the tread depth is shallow and the tire may need to be replaced. The interface 600 may further include a progress indicator 606, such as progress bar. The progress indicator 606 may indicate the progress the mobile device 106 is making in, for example, processing the image 604. Once the image 604 has been processed, the image 604 may be analyzed to determine the status of tire tread depths, as described herein.

Figure 7A:
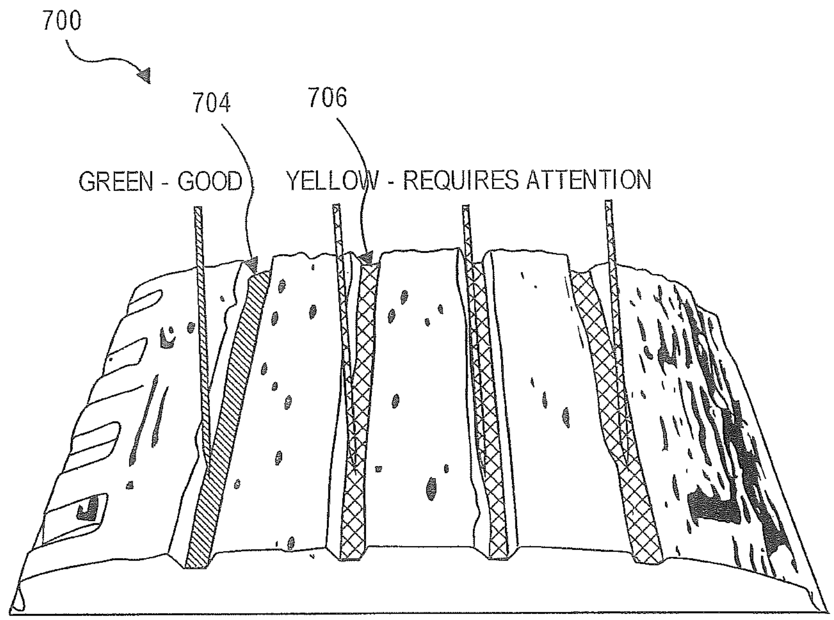
FIGS. 7A and 7B show analyzed images of two tires, according to one aspect of this disclosure.
Figure 7B:
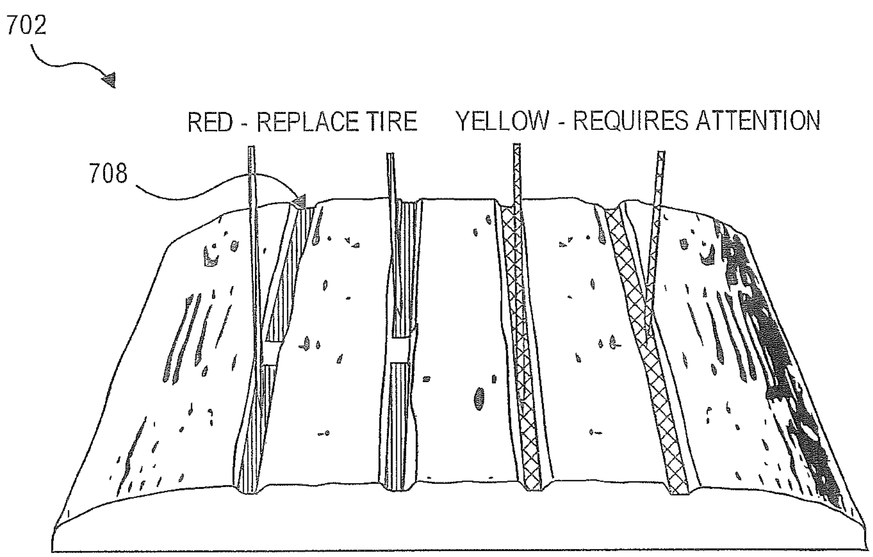

FIGS. 7A and 7B show analyzed images 700, 702 of two tires 104*a*, 104*b*, according to one aspect of this disclosure. Once the image 604 of the tires has been analyzed, the mobile device 106 may show the analyzed images 700, 702. For example, as shown in the tire 104*a* shown in FIG. 7A, one tire tread depth is indicated as having a good tread depth, as indicated by a first hatched mark 704. Also as shown in FIG. 7A, a second tire tread depth is indicated as advising replacement, as shown by a second hatched mark 706. As shown in the tire 104*b* shown in FIG. 7B, tire tread depth is indicated as requiring replacement, as shown by a third hatched mark 708.

Figure 8:
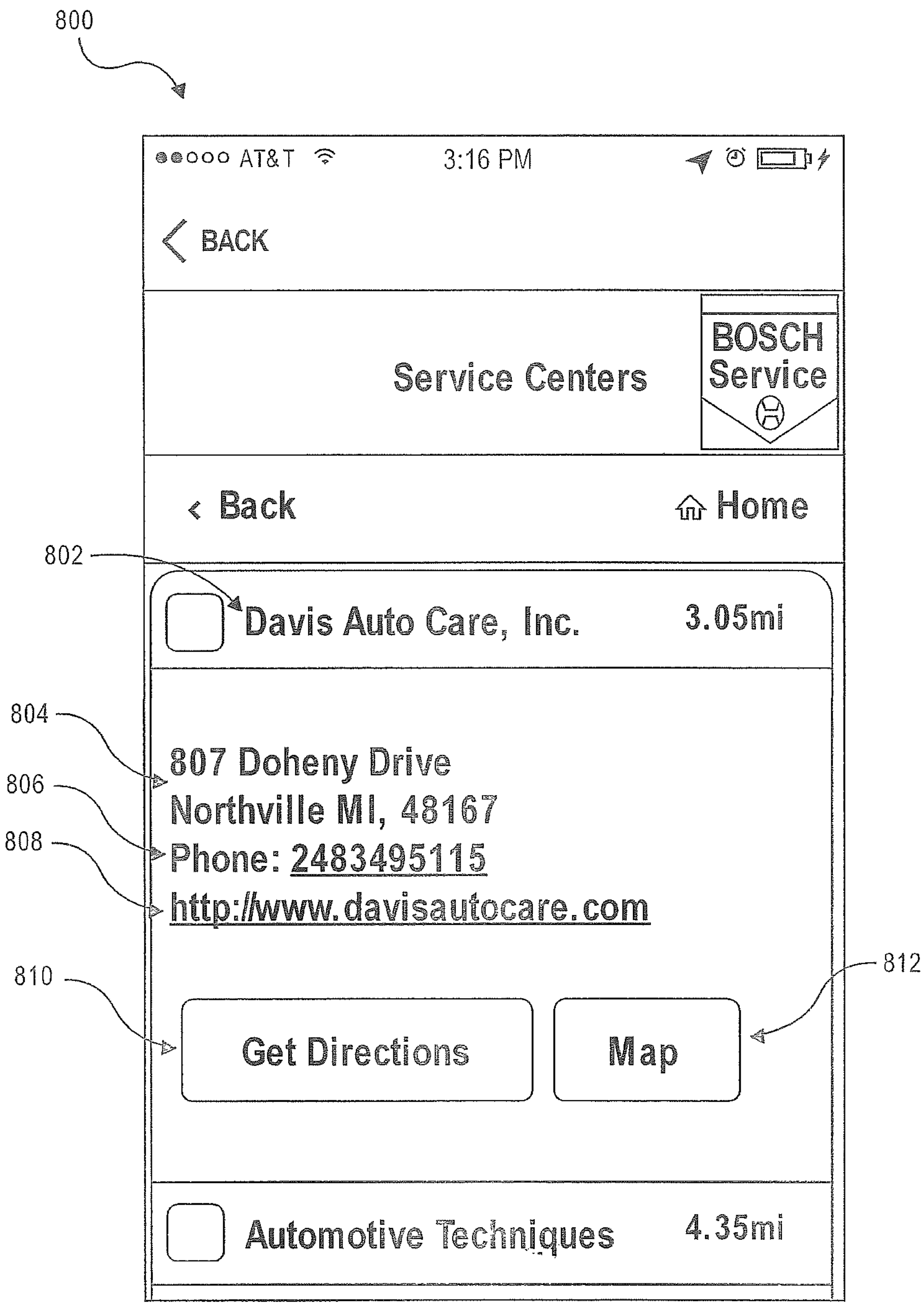
FIG. 8 shows an interface showing automotive service centers near the user, according to one aspect of this disclosure.

FIG. 8 shows an interface 800 showing automotive service centers near the user, according to one aspect of this disclosure. For example, the interface 800 may include a name of the automotive service center 802, an address of the automotive service center 804, a phone number of the automotive service center 806, and a website of the automotive service center 808. The name of the automotive service center 802 may be actuated by the user. For example, the name of the automotive service center 802 may be a hyperlink to, for example, the website of the automotive service center. Additionally, the phone number of the automotive service center 806 may also be actuated by the user. For example, if the user were to actuate the phone number of the automotive service center 806, the mobile device 106 may place a call to the automotive service center. Additionally, the website of the automotive service center 808 may also be browsed by the user. For example, if the user were to actuate the website of the automotive service center 808, the mobile device 106 may open the website using, for example the browser application 218 stored in the mobile device 106.

Additionally, or alternatively, the interface 800 may include a button 810 to retrieve directions to the automotive service center. If a user actuated button 810, the mobile device 106 may use the GPS 206 in the mobile device 106 to retrieve the location of the mobile device 106. After retrieving the location of the mobile device 106, the mobile device 106 may use a mapping application located on the mobile device 106 to receive directions from the location of the mobile device 106 to the automotive service center. Alternatively, the mobile device 106 may receive directions to the automotive service center using an application that is located somewhere other than the mobile device 106. Additionally, the interface 800 may include a button 812 to show a map showing the location of the automotive service center. Similar to receiving directions to the automotive service center, the mobile device 106 may receive a map showing the location of the automotive service center using a mapping application located on the mobile device 106 or an application that is located somewhere other than the mobile device 106.

Figure 9:
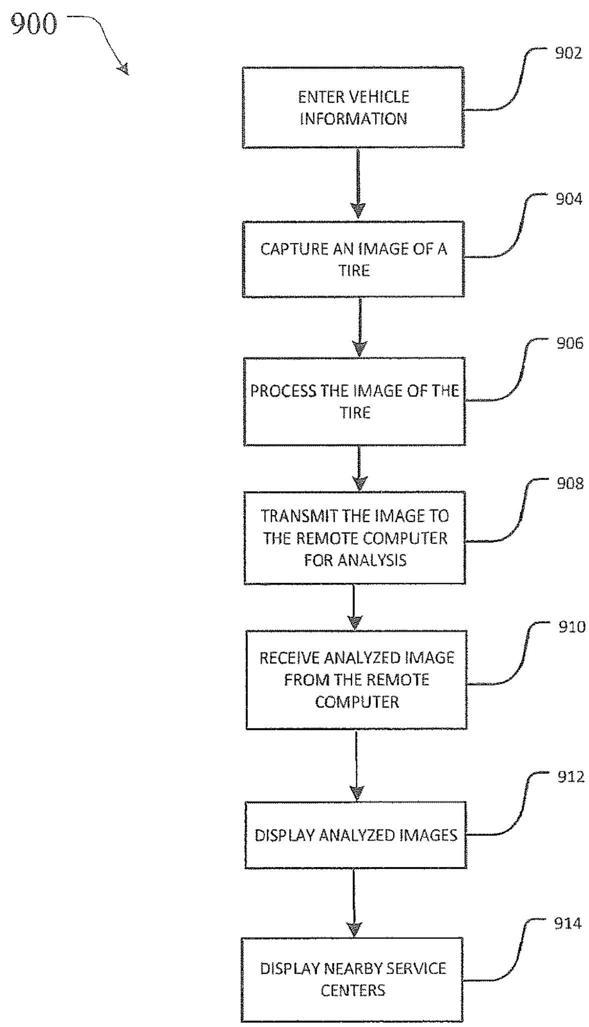
FIG. 9 is a flowchart showing a method of operation on the mobile device, according to one aspect of this disclosure.

FIG. 9 is a flowchart showing a method 900 of operation on the mobile device 106, according to one aspect of this disclosure. The method 900 may begin at block 902. At block 902, the mobile device 106 may receive vehicle identification information to identify the vehicle, as described above with reference to FIG. 5. Additionally, the mobile device 106 may receive the number of tires 104 the user wishes to analyze for tire tread depth. After the mobile device 106 has received the vehicle identification information, the method 900 may proceed to block 904.

At block 904, the mobile device 106 may capture at least one image 604 of a tire 104. The mobile device 106 may receive images 604 for as many tires as the user wishes to analyze for a given vehicle. This process was described above in reference to FIG. 6. After the mobile device 106 has captured an image 604 of a tire 104, the method 900 may proceed to block 906.

At block 906, the mobile device 106 may process the image 604. For example, the mobile device 106 may preprocess the image 604 to adjust for contrast. This process was described with reference to FIG. 6, above. After the mobile device 106 has processed the image 406, the method 900 may proceed to block 908.

At block 908, the mobile device 106 may transmit the image 604 to the remote computer 110. The remote computer 110 may then process the image 604 to determine the status of the tire treads. Alternatively, the mobile device 106 may determine the status of the tire treads without transmitting the image 604 to the remote computer 110. The process for determining the status of the tire treads using the mobile device 106 is the same as the process for determining the status of the tire treads using the remote computer 110. This process is described below with reference to FIG. 10. After mobile device 106 transmits the image 604 to the remote computer, the method 900 may proceed to block 910.

At block 910, the mobile device 106 may receive the analyzed images 700, 702 from the remote computer 110. Alternatively, as described above, the mobile device 106 may generate the analyzed images 700, 702 without transmitting the image 406 to the remote computer 110. After the mobile device has received the analyzed images 700, 702, the method 900 may proceed to block 912.

At block 912, the mobile device 106 may display the analyzed images 700, 702 to the user. The mobile device 106 may indicate the status of the treads using, for example, different colors to indicate different statuses. For example, the mobile device 106 may indicate that a tire tread is in good condition by highlighting the tire tread in green. Additionally, the mobile device 106 may indicate that a tire tread may need to be replaced by highlighting the tire tread in yellow. Additionally, the mobile device 106 may indicate that a tire tread needs to be replaced by highlighting the tire tread in red. The mobile device 106 may use any suitable scheme to indicate the different statuses, including using a scheme unrelated to colors. After the mobile device 106 has displayed the analyzed images 700, 702, the method 900 may proceed to block 914.

At block 914, the mobile device 106 may display nearby service centers based on the GPS location of the mobile device. This display is similar to that described above in connection with FIG. 8. In addition, the mobile device 106 may query various service centers remote computer for the prices, alternative tires, and display the closest store with the best prices. The method 900 may end after displaying nearby service centers.

Figure 10:
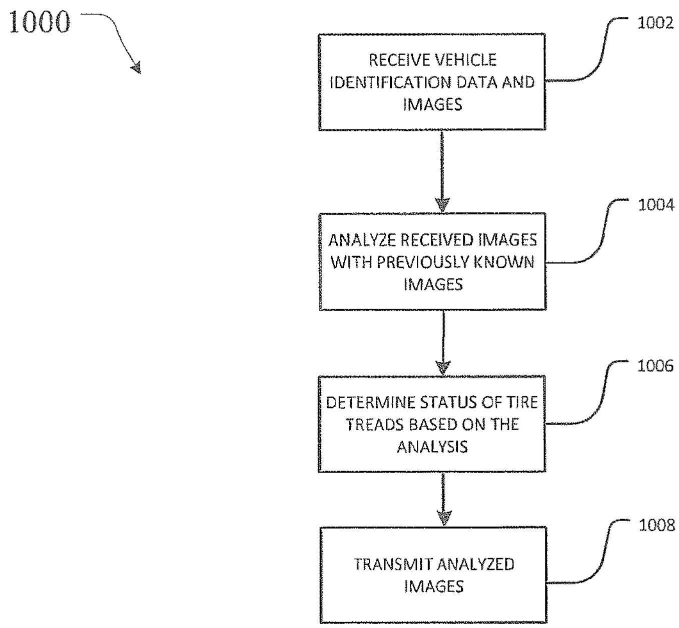
FIG. 10 is a flowchart showing a method of operation on the remote computer, according to one aspect of this disclosure.

FIG. 10 is a flowchart showing a method 1000 of operation on the remote computer 110, according to one aspect of this disclosure. The method 1000 may begin at block 1002. At block 1002, the remote computer 100 may receive vehicle identification data and an image 604 of a tire 104 from, for example, the mobile device 106. The remote computer 110 may determine the make, model, and type of tire associated with the particular make and model using, for example, the VIN API 316. After the remote computer 110 receives the vehicle identification data and an image 604 of the tire 104 and identifies the vehicle, the method 1000 may proceed to block 1004.

At block 1004, the remote computer 110 may analyze the image 604 with previously known images. The previously known images may be stored in the memory 312. For example, based on the vehicle identification using the VIN API 316, the remote computer 110 may analyze the receive image 604 with the particular tire 104 used with the vehicle 102. For example, the image 604 may be analyzed using the Tire Tread Scan API 322. The Tire Tread Scan API may use any suitable algorithm to compare the image 604 with previously known images.

One algorithm the Tire Tread Scan API may use is a supervised machine learning algorithm. When using the supervised machine learning algorithm, a collection of data points, such as images of tires having a variety of tire tread statuses may be provided to the remote computer 110. The remote computer 110 may then use this collection of data points to understand which tire tread depths are in good condition, which may need to be replaced, and which need to be replaced. The remote computer 110 may be constantly trained to reach more accurate determinations of tire tread status by, for example, providing additional tire tread depth images. For example, the Reporting unit 324 may be used to collect tire tread depth reports to increase the number of data points available to train the remote computer 110. After the remote computer 110 has been trained, the remote computer 110 may use a predicate functional algorithm. The predicate functional algorithm may be used at runtime to determine the status of the tire treads shown in the image 604.

Alternatively, the remote computer 110 may use unsupervised machine learning. In this method, the image 604 is compared to standard attributes instead of using previously known images.

Alternatively, the Tire Tread Scan API may use inertial measurement units (IMUs). IMUs may include accelerometers, gyroscopes, and magnetometers. If this method is used, the mobile device 106 may capture multiple images of the tire 104 from various angles. The remote computer 110 may use these multiple images to generate a three-dimensional model of the tire 104. Based on the three-dimensional model, the remote computer 110 may generate accurate measurements of the tire tread depths. After the remote computer 110 has analyzed the image 604, the method 1000 may proceed to block 1006.

At block 1006, the remote computer 110 may determine the status of the tire tread depths based on the analysis in block 1004. For example, the remote computer 110 may determine a tire tread depth for each tire tread. Then, the remote computer 110 may compare the determined tire tread depth to values for tire tread depth status. For example, if the determined tire tread depth is 5⁄32" or greater, the remote computer 110 may determine that the tire tread depth is in good condition. If the remote computer 110 determines that the tire tread depth is between, for example, 2⁄32" and 5⁄32", then the remote computer 110 may determine that the tire 104 may need to be replaced. If the remote computer 110 determines that the tire tread depth is less than, for example, 2⁄32", then the remote computer 110 may determine that the tire 104 needs to be replaced. The remote computer 110 may alter the image 604 to indicate the status of each individual tire tread, such as by coloring the tire treads based on their status. Alternatively, the remote computer 110 may generate new images indicating the status of each individual tire tread. After the remote computer 110 determines the status of the tire treads, the method 1000 may proceed to block 1008.

At block 1008, the remote computer 110 may transmit the analyzed image to the mobile device 106 for display. After the remote computer 110 transmits the analyzed image, the method 1000 ends.

The device and process may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The device and process may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the disclosure are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method for measuring tire tread depth, the method comprising:

collecting images, with a processor of a computing device, of tires having a variety of tire tread for use with a supervised machine learning algorithm to determine a tire tread depth;

receiving an image, with the processor, of a tire tread recorded using an image-recording device on a mobile device;

receiving a vehicle image taken by the image-recording device by the processor, a vehicle includes the tire tread;

identifying the vehicle with the processor using optical recognition;

analyzing, with the processor using a software, the image of the recorded tire tread to determine a tire tread depth;

determining, with the processor, a status of the tire tread based on the tire tread depth;

altering, with the processor, the image of the recorded tire tread based on the determined status;

transmitting, with the processor, the altered image to the mobile device; and displaying, on a display of the mobile device, a closest automotive service center with best tire prices.

2. The method of claim 1, wherein analyzing further comprises:

comparing the image of the recorded tire tread with historical tire tread images.

3. The method of claim 1, wherein analyzing further comprises:

collecting data points to generate the algorithm to determine a tire tread depth.

4. The method of claim 3, wherein the algorithm further includes predictive functional algorithm.

5. The method of claim 1, wherein analyzing further comprises:

comparing the image of the recorded tire tread with standard attributes.

6. The method of claim 1, further comprising:

receiving a plurality of images of the tire tread;

generating a three-dimensional model based on the plurality of images of the tire tread; and determining the tire tread depth using the three-dimensional model.

7. A system for measuring tire tread depth, the system comprising:

a transceiver configured to receive and transmit an image of a tire tread and an image of a vehicle with the tire tread to and from a mobile device;

a computer-readable storage medium configured to store computer-executable instructions; and a computer processor configured to execute the computer-executable instructions, the computer-executable instructions comprising:

diagnosing, with the processor using a diagnostic application, diagnostic trouble code set in the vehicle;

receiving an image of the vehicle taken by an image-recording device of the mobile device by the processor;

identifying the vehicle with the processor using optical recognition;

collecting images of tires having a variety of tire tread for use with a supervised machine learning algorithm to determine a tire tread depth;

receiving an image of the tire tread recorded using the image-recording device;

analyzing the image of the recorded tire tread to determine a tire tread depth;

determining a status of the recorded tire tread based on the tire tread depth;

altering the image of the recorded tire tread based on the determined status;

transmitting the altered image to the mobile device; and displaying, on a display of the mobile device, a closest automotive service center with best tire prices.

8. The system of claim 7, wherein the computer-executable instructions further comprise:

comparing the image of the recorded tire tread with historical tire tread images.

9. The system of claim 7, wherein the computer-executable instructions further comprise:

collecting data points to generate an algorithm to determine a tire tread depth.

10. The system of claim 9, wherein the algorithm is a predictive functional algorithm.

11. The system of claim 7, wherein the computer-executable instructions further comprise:

comparing the image of the recorded tire tread with standard attributes.

12. The system of claim 7, wherein the computer-executable instructions further comprise:

receiving a plurality of images of the tire tread;

generating a three-dimensional model based on the plurality of images of the tire tread; and determining the tire tread depth using the three-dimensional model.

13. A method for measuring tire tread depth, the method comprising:

diagnosing, with a processor using a diagnostic application, diagnostic trouble code set in a vehicle with a tire tread;

receiving an image of the vehicle taken by an image-recording device of a mobile device by the processor;

identifying the vehicle with the processor using optical recognition;

collecting, with the processor, images of tires having a variety of tire tread for use with a supervised machine learning algorithm to determine a tire tread depth;

recording, with the processor, an image of a tire tread using the algorithm to determine a tire tread depth;

analyzing, with the processor, the image of the recorded tire tread to determine a tire tread depth;

determining, with the processor, a status of the recorded tire tread based on the tire tread depth;

altering, with the processor, the image of the recorded tire tread based on the determined status; and displaying the altered image of the tire tread on a display of the mobile device and a closest automotive service center with the best tire prices.

14. The method of claim 13, further comprising:

transmitting the image of the recorded tire tread to a remote central processing unit; and receiving from the remote central processing unit an altered image of the tire tread indicating the status of the recorded tire tread.

15. The method of claim 13, wherein analyzing further comprises: comparing the image of the recorded tire tread with historical tire tread images.

16. The method of claim 13, wherein analyzing further comprises: collecting data points to generate the algorithm to determine a tire tread depth.

17. The method of claim 16, wherein the algorithm is a predictive functional algorithm.

18. The method of claim 13, wherein analyzing further comprises:

comparing the image of the recorded tire tread with standard attributes.

19. The method of claim 13, further comprising:

receiving a plurality of images of the tire tread;

generating a three-dimensional model based on the plurality of images of the tire tread; and determining the tire tread depth using the three-dimensional model.

20. The method of claim 19, further comprising:

displaying the three-dimensional model.

* * * * *